J. M. SILLIMAN.
DEMOUNTABLE METAL TIRE FOR VEHICLE WHEELS.
APPLICATION FILED OCT. 5, 1918.
1,306,286.
Patented June 10, 1919.
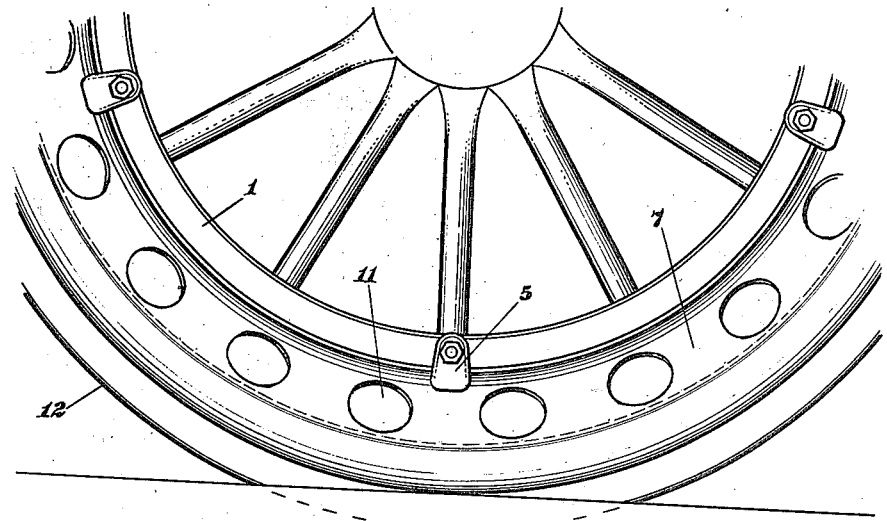
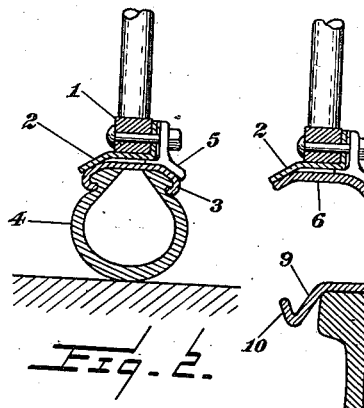
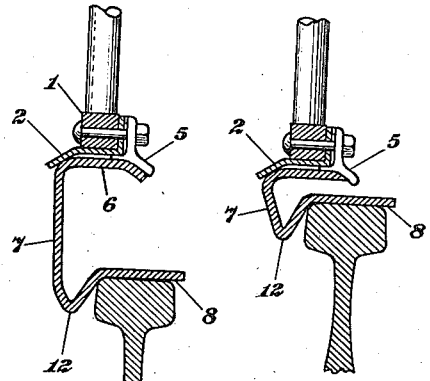
Inventor,
J. M. Silliman
By J. Edward Maybee
Atty.

UNITED STATES PATENT OFFICE.

JUSTUS MITCHELL SILLIMAN, OF LONDON, ONTARIO, CANADA.

DEMOUNTABLE METAL TIRE FOR VEHICLE-WHEELS.

1,306,286.  Specification of Letters Patent.  Patented June 10, 1919.

Application filed October 5, 1918. Serial No. 256,996.

*To all whom it may concern:*

Be it known that I, JUSTUS M. SILLIMAN, a citizen of the United States, and resident of the city of London, county of Middlesex, Province of Ontario, Canada, have invented certain new and useful Improvements in Demountable Metal Tires for Vehicle-Wheels, of which the following is a specification.

It is frequently desirable to be able to use road vehicles, and particularly automobiles, on the rails of a railway track. This necessitates the substitution for the ordinary road tire of a special tread which, to give satisfactory results, must possess the following characteristics. The tire must be easily and quickly placed in position and removed; the tread of the tire must be offset relative to the wheel as the gage of the wheels of a road vehicle differs from that of a railway; the tread surface should be at approximately the same distance from the hub of the wheel as the tread surface of the road tire which the special tread replaces; the special tire should be as light as possible and therefore of such a shape that it may be pressed or rolled from sheet metal; the tire must be flanged; and, so that the wheels may run properly over switches, crossings, etc., the flange and tread surface must correspond closely in shape with that adapted by the Master Car Builders' Association for railway car wheels.

The object of this present invention therefore is to devise a demountable metal tire which will possess the foregoing characteristics. I attain my object by means of the constructions hereinafter described and illustrated in the accompanying drawings in which—

Figure 1 is a side elevation of part of a wheel provided with my improved detachable steel tire;

Fig. 2 a cross section of part of the rim of a wheel showing an ordinary pneumatic tire in place thereon;

Fig. 3 a similar view showing my steel tire in place on the rim of a wheel and in engagement with a railway rail; and Figs. 4 and 5 are similar views showing modifications of the steel tire.

In the drawings like numerals of reference indicate corresponding parts in the different figures.

1 is the felly of a vehicle wheel of any ordinary construction, to which felly is secured the fixed rim 2, which is of the type commonly employed with demountable pneumatic tires. 3 is a demountable rim which carries the pneumatic tire 4. This rim is held in place by the clips and bolts 5 in the ordinary manner. This construction is all old in the art and I make no claim thereto, my invention lying in the construction of the steel tire which is adapted to be secured to the fixed rim 2 in place of the pneumatic tire 4 with its rim 3.

My steel tire is formed of sheet metal rolled or pressed to shape to form a rim 6, which is connected by means of the connecting web 7 with the tread 8. This web is preferably integral with the outer edges of the rim 6 and the tread 8 as shown in Fig. 3. At the inner or free edge of the tread is formed a flange 9, the lower edge of which preferably is recurved as shown forming a lip 10 which stiffens the flange and gives its lower edge substantially the formation of the flange of an ordinary car wheel when made according to the specifications of the Master Car Builders' Association. The depth of the flange and the width of the tread will also be as set forth in such specifications, so that the steel tire will act in every way on the railway line as would an ordinary car wheel. This is particularly important when switches have to be entered, or crossings passed.

As the gage of the ordinary railway track is different from that of the wheels of a road vehicle, the tread 8 is offset laterally as shown to give it the proper position. While the sheet metal construction shown is reasonably light, considerable weight may be saved by cutting away portions as indicated particularly in Fig. 1 where holes 11 are shown formed in the web 7.

While I prefer the arrangement of the tire shown in Fig. 3, as being more easily rolled or pressed, I may also employ the forms shown in Figs. 4 and 5 in which the web 7 connects the inner edges of the rim and tread and the flange is formed by a V-shaped rib 12 pressed out at the junction of the tread and the web.

The construction shown in Fig. 5 only differs from the construction shown in Fig. 4 in that the tread and rim are not spaced so far apart. It is important for proper running, particularly of an automobile, on the tracks that the distance of the tire tread from the hub be the same when the car is running on the track as when it is running on the road. The extent of the spacing between the rim and tread will vary, of course, dependent on the depth of the tire with which the wheel is equipped for road running. It is easy of course with my construction of steel tire to increase the distance of the tread from the wheel hub in cases where the smooth road bed warrants a larger gear ratio between the power plant and the wheels than is permissible in road running.

While normally the steel tire will be sufficiently strong for all ordinary purposes, any suitable filling may be inserted therein to strengthen or stiffen it as may be deemed desirable.

What I claim as my invention is:—

1. The combination with a wheel provided with a fixed rim of a metal tire provided with a rim adapted to fit on the fixed rim, a tread spaced from the rim in a radial direction and laterally offset relative to the wheel, and a flange at the inner side of the tread.

2. The combination with a wheel provided with a fixed rim of a metal tire adapted to fit on the fixed rim and shaped from sheet metal to form a rim adapted to fit on the fixed rim, a tread spaced from the rim in a radial direction and laterally offset relative to the wheel, a web connecting one edge of the rim with one edge of the tread, and a flange at the inner side of the tread.

3. The combination with a wheel provided with a fixed rim of a metal tire adapted to fit on the fixed rim and shaped from sheet metal to form a rim adapted to fit on the fixed rim, a tread spaced from the rim in a radial direction and laterally offset relative to the wheel, a web connecting the outer edge of the rim with the outer edge of the tread, and a flange formed at the free inner side of the tread.

4. The combination with a wheel provided with a fixed rim of a metal tire adapted to fit on the fixed rim and shaped from sheet metal to form a rim adapted to fit on the fixed rim, a tread spaced from the rim in a radial direction and laterally offset relative to the wheel, a web connecting the outer edge of the rim with the outer edge of the tread, and a flange formed at the free inner side of the tread provided with an outwardly recurved lip at its lower edge.

Signed at Oneonta, New York, this 19th day of September, 1918.

JUSTUS MITCHELL SILLIMAN.

Witnesses:
 DUANE B. EDDY,
 C. P. CURRIER.